United States Patent [19]

Dyal

[11] 4,211,254
[45] Jul. 8, 1980

[54] NORMALLY CLOSED PRESSURE COMPENSATED FLOW CONTROL VALVE

[75] Inventor: Elton E. Dyal, Wood Dale, Ill.

[73] Assignee: Modular Controls Corporation, Villa Park, Ill.

[21] Appl. No.: 955,938

[22] Filed: Oct. 30, 1978

[51] Int. Cl.² .......................................... F15B 13/04
[52] U.S. Cl. ................... 137/596.12; 60/466; 60/469; 91/443; 91/446; 137/596.2; 137/613
[58] Field of Search ................... 91/443, 446; 137/596.12, 596.2; 60/461, 466, 469

[56] References Cited

U.S. PATENT DOCUMENTS

| | | | |
|---|---|---|---|
| 2,157,707 | 5/1939 | Keel | 91/446 |
| 2,345,973 | 4/1944 | Harrington | 91/446 |
| 2,570,317 | 10/1951 | Busson | 60/466 X |
| 2,570,351 | 10/1951 | Klessig | 60/466 X |
| 2,583,296 | 1/1952 | Harrington | 60/466 X |
| 3,376,792 | 4/1968 | Clarke et al. | 91/446 X |
| 3,882,896 | 5/1975 | Budzich | 91/446 X |

*Primary Examiner*—Gerald A. Michalsky
*Attorney, Agent, or Firm*—Trexler, Wolters, Bushnell & Fosse, Ltd.

[57] ABSTRACT

A fluid flow control valve assembly provides metering of the hydraulic fluid from a cylinder port at a constant desired rate for lowering a load at a corresponding constant rate which has been raised by the cylinder. The valve assembly comprises a normally closed valve having an input orifice communicating with the cylinder port and an output orifice and is selectively actuable for permitting the flow of fluid from the cylinder. A normally closed pressure compensating valve has an input orifice communicating with the normally closed valve output orifice, an output orifice, and a control input adapted for direct communication with the cylinder port for continuously sensing the fluid pressure within the cylinder. The pressure compensating valve maintains a constant fluid flow pressure differential and a constant fluid flow rate from the cylinder. A baffle restricts the rate of fluid flow from the normally closed valve to thereby cause the pressure compensating valve to gradually increase the fluid flow rate from the cylinder to a desired fluid flow rate and the compensating valve thereafter maintains the fluid flow rate constant responsive to the cylinder pressure sensed at the control input. The pressure compensating valve is maintained normally closed by the control input prior to the actuation of the normally closed valve.

13 Claims, 2 Drawing Figures

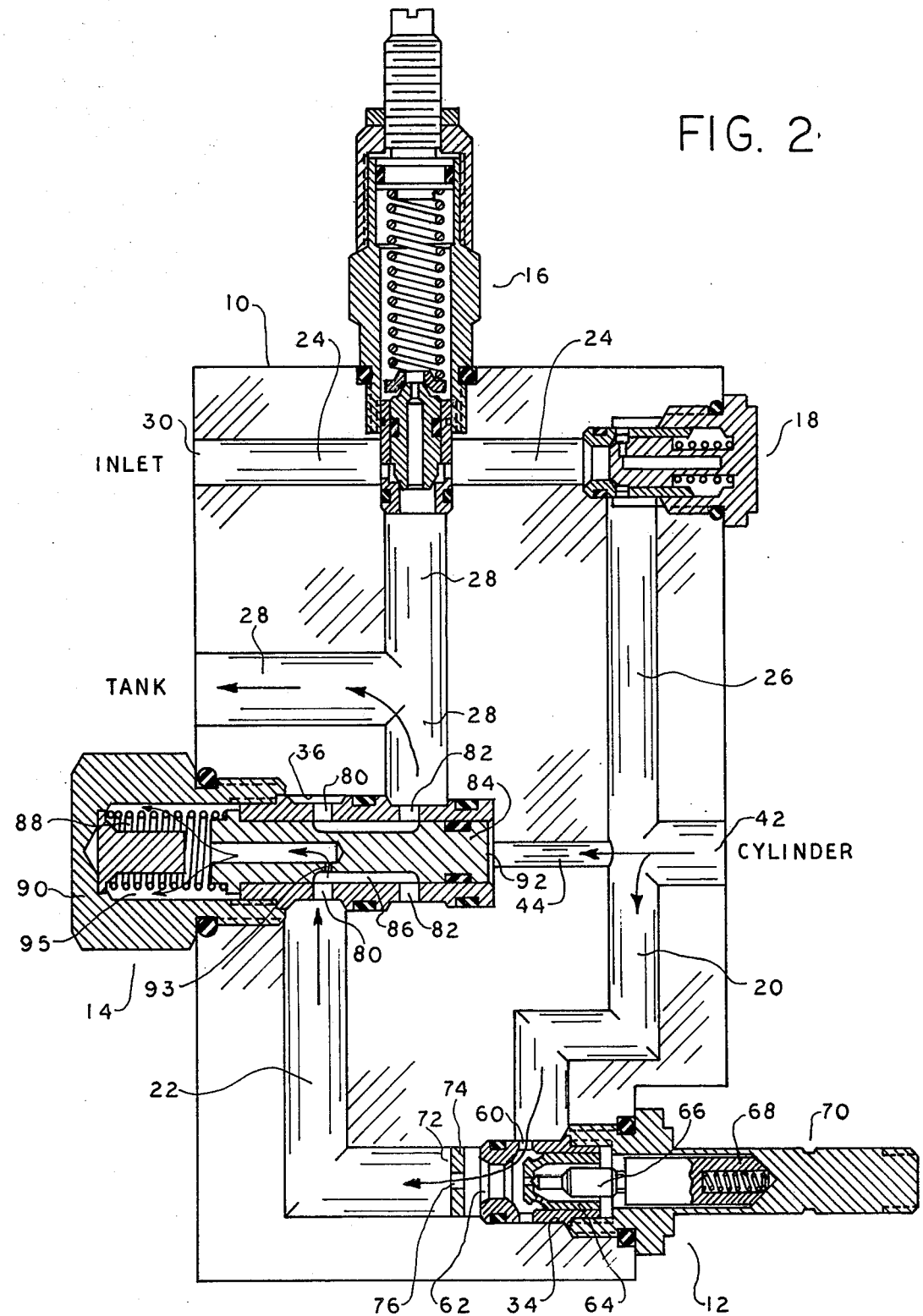

NORMALLY CLOSED PRESSURE COMPENSATED FLOW CONTROL VALVE

BACKGROUND OF THE INVENTION

The present invention is generally directed to a fluid flow control valve assembly and in particular to such an assembly which meters hydraulic fluid from a cylinder port at a constant rate for lowering a load at a corresponding constant rate which has been raised by the cylinder.

Hydraulic systems for raising and lowering heavy loads are well known in the art. Such systems may include, for example, a hydraulic cylinder having a moveable piston disposed therein which is connected at one end to a load to be raised and lowered by suitable linkages. The cylinder usually includes a port below the piston and as hydraulic fluid is forced into the cylinder through the port under pressure, the piston is forced upwardly by the fluid within the cylinder to in turn cause the load to be raised. To lower the load it is necessary to exhaust the hydraulic fluid from the cylinder. Because heavy loads generate a great amount of inertia as they are lowered, it is necessary to provide a valve system which meters the hydraulic fluid being exhausted from the cylinder at a constant rate to assure that the load will be lowered at a corresponding constant safe rate. Obviously, metering of the hydraulic fluid in this manner as the load is lowered is necessary to avoid damage to the hydraulic load rasing system and to the load itself as the load is lowered.

Prior fluid flow control valve systems to accomplish this end have generally included a control valve which maintains a constant pressure within the fluid line conducting the exhausted fluid. Such valves are normally open valves, that is to say, at the instant the hydraulic fluid is first allowed to flow from the cylinder, a great influx of hydraulic fluid impinges upon the normally opened pressure control valve. Such valves also include a fluid flow restricting orifice which is integral to the member within the valve which is instrumental in maintaining the constant fluid pressure. As a result, when the pressure control valve receives the initial influx of exhausted hydraulic fluid, it overcompensates responsive to the influx of fluid and reduces the flow rate of the fluid to a greater extent than necessary. The difference in pressure resulting from the initial overcompensation causes the control valve to again overcompensate and to allow an excessive amount of fluid to flow from the cylinder. This cycle tends to repeat itself many times before a constant flow rate is obtained. As a result, loads are lowered in a jerky or discontinuous manner which creates a hazard when the heavy loads are abruptly halted during their descent.

It is therefore a general object of the present invention to provide a new and improved fluid flow control valve system.

It is a more particular object of the present invention to provide a new and improved fluid flow control valve system for metering fluid from a cylinder port at a constant desired rate for lowering a load at a corresponding constant rate which has been raised by the cylinder.

It is more particular object of the present invention to provide such a system which includes a normally closed pressure compensating valve which gradually opens responsive to the initial flow of fluid from the hydraulic cylinder for gradually increasing the rate of fluid flow from the cylinder until a desired fluid flow rate is obtained and to thereafter maintain the fluid flow rate constant.

SUMMARY OF THE INVENTION

The invention provides a normally closed pressure compensated fluid flow control valve assembly for metering fluids from a cylinder port at a desired constant rate for lowering a load at a corresponding constant rate which has been raised by the cylinder. The valve assembly comprises valve means coupled to the cylinder port and selectively actuable for permitting fluid to flow from the cylinder and normally closed pressure compensating valve means coupled to the valve means and disposed downstream from the valve means with respect to the fluid flow from the cylinder for maintaining a constant fluid flow pressure and a constant fluid flow rate. The valve assembly also comprises a baffle means between the valve means and the normally closed pressure compensating valve means for restricting the rate of fluid flow from the valve means to the normally closed pressure compensating valve means. The normally closed pressure compensating valve means is arranged to gradually open for gradually increasing the fluid flow rate to a desired fluid flow level and to maintain the fluid flow rate constant thereafter.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 2 is a cross-sectional view of the control valve assembly embodying the present convention illustrating its operation during the lowering of a load.

DESCRIPTION OF THE PREFERRED EMBODIMENT

Figure 1:
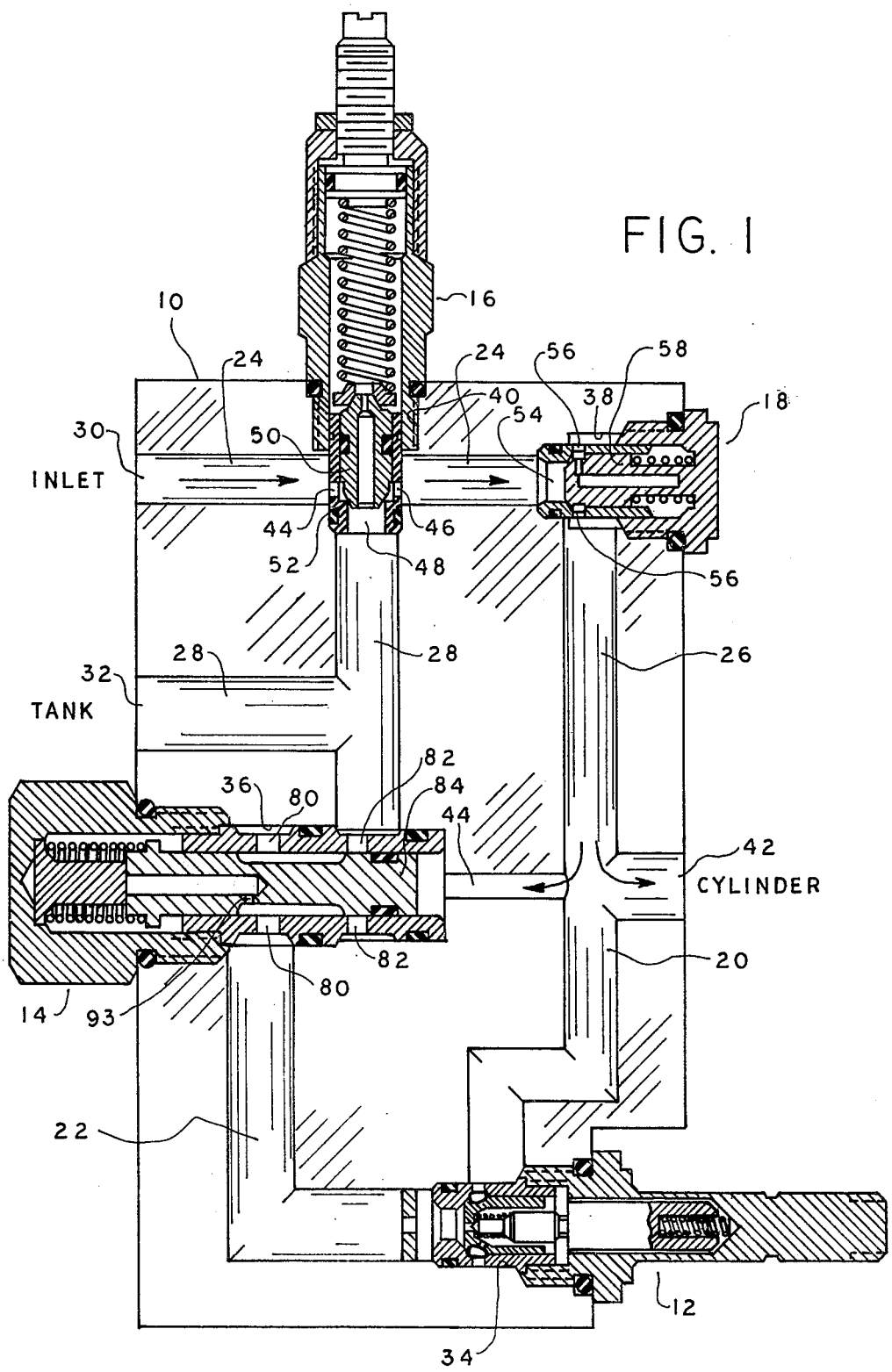
FIG. 1 is a cross-sectional view of a control valve assembly embodying the present convention illustrating its operation during the raising of a load.

Referring now to FIG. 1, the valve assembly there shown which embodies the present invention generally includes a valve block 10, a first valve 12, a pressure compensating valve 14, a relief valve 16, and a check valve 18. The valve block 10 is formed from solid metallic material which preferably is corrosion resistant. It includes a plurality of fluid communicating channels including a first channel 20, a second channel 22, a third channel 24, a fourth channel 26, and a return channel 28. The valve block 10 also includes an inlet port 30 communicating with the third channel 24 and a tank port 32 communicating with the return channel 28. The inlet port 30 and tank port 32 are adapted for being coupled to a source of hydraulic fluid. Preferably, a pump (not shown) is disposed between the source of hydraulic fluid and the inlet port 30 to provide the valve system with hydraulic fluid under pressure.

The valve block also includes a plurality of valve receiving bores including a first valve receiving bore 34, a second valve receiving bore 36, a third valve receiving bore 38, and a fourth valve receiving bore 40 which intersects the third communicating channel 24. As shown, the first and fourth fluid communicating channels 20 and 26 respectively communicate with each other and with an outlet port 42 which is adapted for being coupled to the cylinder of the hydraulic system. The outlet port 42 is also in fluid communication with a control fluid port 44 which is provided for a purpose to be more fully described hereinafter.

Disposed within the fourth valve receiving bore 40 is the pressure relief valve 16. The pressure relief valve 16 is of a type well known in the art and therefore, it need not be described in detail herein. Suffice it to say that the pressure relief valve 16 includes an inlet orifice 44, an outlet orifice 46, a relief orifice 48, and a moveable piston 50. An annular channel 52 surrounds the pistion 50 and provides fluid communication between the inlet orifice 44 and the output orifice 46. When the fluid pressure within the third channel 24 exceeds a predetermined limit, the piston 50, is caused to move in a axial direction to permit overflow fluid to flow from the input orifice 44 to the relief orifice 48 to preclude excessive pressure from being developed within the valve block 10. The fluid flowing through the relief orifice 48 is returned to the source of hydraulic fluid through the return channel 28.

Within the third valve receiving bore is the check valve 18. It includes an input orifice 54, output orifices 56, and a moveable piston 58. As well known, when fluid enters the input orifice 54, the piston 58 will be caused to move axially allowing the fluid to flow from the input orifice 54 to the output orifices 56. However, fluid flow in the reverse direction is precluded by the piston 58.

From the foregoing, it can be seen that hydraulic fluid can be supplied to the cylinder for raising a load when fluid is introduced into the inlet port 30 under pressure. The fluid will flow from the inlet port 30, through the third channel 24 including relief valve 16 through the check valve 18, through the fourth channel 26, and to the outlet port 32 which is coupled to the hydraulic cylinder.

Referring now to FIG. 2, the first valve 12 comprises a normally closed valve which may be selectively actuated by a solenoid (not shown). To that end, valve 12 includes an input orifice 60 which communicates with the first channel 20, an output orifice 62 which communicates with the second channel 22, a poppet 64, a plunger 66, and a magnetic core 68. The external end 70 of the valve is configured to accept a solenoid coil thereover which is contained in a suitable cylindrical housing having an aperature therethrough, which aperature receives the external end 70 of the valve. Upon energization of the solenoid, the magnetic core 68 is moved axially by the magnetic field generated by the solenoid. The plunger 66, which is mechanically linked to the core 68, likewise moves in an axial direction to release the poppet 64 which is freely moveable within the valve. In a well known manner, the poppet 64 will also move axially to provide fluid communication between the input oriface 60 and the output orifice 62 of the valve. Thus, upon actuation of the normally closed valve 12, hydraulic fluid will be permitted to flow from the cylinder of the hydraulic system.

A baffle 72 is disposed within the second channel 22 between the first valve 12 and the pressure compensating valve 14. It comprises a partition wall 74 having an aperture 76 therethrough. The dimension of the aperture 76 is much smaller than the cross sectional dimension of the second channel 22 and thus restricts the flow rate of the fluid from the hydraulic cylinder within the first channel 20 and the second channel 22. The size of the aperature 76 is selected to provide a desired hydraulic fluid flow rate for the system upon the lowering of the load.

The pressure compensating valve 14 is disposed within the second valve receiving bore 36 and is of a type also well known in the art. It includes input orifices 80 which are in fluid communication with the second channel 22, output orifices 82 which are in fluid communication with the return channel 28, a moveable piston 84 having a minimum diameter portion forming an annular channel 86, and a spring 88 which acts between the piston 84 and the rearward end of the outer casing 90 of the valve 14. The pressure compensating valve 14 also includes a control input in the form of the piston end surface 92 which is in fluid communication with the outlet port 42 by the control fluid channel 44.

When the load is at its raised position, it will remain in its raised position as long as the normally closed valve 12 remains closed. Because the check valve 18 precludes fluid flow from the fourth channel 26 to the third channel 24, the fluid within the cylinder will not be allowed to flow from the cylinder. Hence, the fluid pressure within the cylinder acts upon the piston end surface 92 to force the piston 84 in an axial direction (towards the left as shown) so that the pressure compensating valve will be in a normally closed position as shown in FIG. 1. In FIG. 1, it can be seen that the piston 84 is at a position whereby fluid communication between the input ports 80 and the output ports 82 is blocked by the piston 84. Hence, when the normally closed valve 12 is actuated, the initial flow of hydraulic fluid from the cylinder will see a normally closed pressure compensating valve 14. As used herein therefore, the term "normally closed pressure compensating valve" is intended to apply to any pressure compensating valve which, when disposed within an operative system, poses a blockage to initial flow of fluid from the cylinder for lowering a load, whether or not the valve is structured to be open or closed prior to its incorporation into an operative system.

When the normally closed valve 12 is actuated, fluid will flow from the cylinder causing fluid flow through the first channel 20, the valve 12, the baffle 72, the pressure compensating valve 14, and the return channel 28 in a direction indicated by the arrows. The initial flow of fluid sees a blockage presented by the pressure compensating valve 14. However, fluid will act as indicated, through orifice 93 and pressurize the chamber 95 to cause the piston 84 to move to the right under the added influence of the spring 88. As a result, the pressure compensating valve 14 will gradually open and increase the rate of fluid flow from the hydraulic cylinder. The pressure compensating valve 14 will continue to open until the desired fluid flow rate is achieved. That fluid flow rate is determined by the size of the aperture 76 in partition wall 74 and also by the spring constant of spring 88. Because a constant pressure differential is maintained across aperture 76 by the pressure compensating valve 14, once the desired fluid flow rate is obtained, the pressure compensating valve 14 will maintain a constant fluid flow rate thereafter.

Hence, it can be seen, that the present invention provides a new and improved fluid flow control valve assembly for metering fluid from a cylinder for lowering a load at a continuous and constant rate. Because the initial flow of fluid from the hydraulic cylinder sees a normally closed pressure compensating valve, jerky or abrupt lowering of the load is precluded. Because the pressure compensating valve 14 opens gradually from its closed position, over-compensation responsive to initial fluid flow is precluded, thereby assuring that abrupt starting and stopping of the load as it descends will not occur.

While a particular embodiment of the invention has been shown and described, modifications may be made, and it is intended in the appended claims to cover all such changes and modifications which fall within the true spirit and scope of the invention.

The invention is claimed as follows:

1. A normally closed pressure compensated fluid flow control valve assembly for metering fluid from a cylinder port at a desired rate for lowering a load at a corresponding desired rate said valve assembly comprising: a valve means coupled to the cylinder port and selectively actuable for permitting fluid to flow from the cylinder; a normally closed pressure compensating valve means coupled to said valve means and disposed downstream from said valve means with respect to the fluid flow from the cylinder for maintaining a desired fluid flow pressure and a desired fluid flow rate, said normally closed pressure compensating valve means including a control input adapted to be directly coupled to the cylinder through said cylinder port for continuously sensing the fluid pressure within the cylinder; and means between said valve means and said normally closed pressure compensating valve means for restricting the rate of fluid flow from said valve means to said normally closed pressure compensating valve means; said normally closed pressure compensating valve means being arranged to gradually open upon the actuation of said valve means for gradually increasing the fluid flow rate to a desired fluid flow level and to maintain the desired fluid flow rate thereafter responsive to the cylinder pressure sensed by said control input.

2. A valve assembly as defined in claim 1 wherein said control input maintains said normally closed pressure compensating valve means closed responsive to the fluid pressure sensed at said control input prior to the actuation of said valve means.

3. A valve assembly as defined in claim 1 further comprising a fluid channel coupling said valve means to said normally closed pressure compensating valve means, said fluid channel having a predetermined cross-sectional dimension, and wherein said fluid flow restricting means comprises a partition wall disposed within said channel intermediate said valve means and said normally closed pressure compensating valve means and having an aperture therethrough, said aperture being of smaller dimension than said channel dimension for restricting said fluid rate between said valve means and said normally closed pressure compensating valve means.

4. A valve assembly as defined in claim 1 wherein said normally closed pressure compensating valve means further includes a chamber arranged to receive fluid from said valve means when said valve means is actuated and valve opening means between said chamber and said control input and responsive to the difference in pressure within said chamber and the cylinder as sensed by said control input for gradually opening said normally closed pressure compensating valve means.

5. A valve assembly as defined in claim 4 further including biasing means within said chamber and arranged to act upon said opening means for assisting in the opening of said pressure compensating valve means.

6. A fluid flow control valve system for metering fluid from a cylinder port at a constant desired rate for lowering a load at a corresponding constant rate which has been raised by the cylinder, said valve system comprising: a valve block of solid material having a plurality of valve receiving bores and a plurality of fluid communicating channels; a first valve within a first one of said valve receiving bores, said first valve having an input orifice communicating with the cylinder port by a first one of said fluid communicating channels and an output orifice, and being selectively actuable for permitting the flow of fluid from the cylinder; a normally closed pressure compensating valve within a second one of said valve receiving bores, said normally closed pressure compensating valve having an input orifice communicating with said first valve output orifice by a second one of said fluid communicating channels and an output orifice for maintaining a constant fluid flow pressure and a constant fluid flow rate through said first and second fluid communicating channels and further including a control input communication with said first fluid communicating channel for directly and continuously sensing the fluid pressure within the cylinder; and baffle means within said second fluid communicating channel between said first valve and said normally closed pressure compensating valve for restricting the rate of fluid flow from said first valve to said normally closed pressure compensating valve within said second fluid communicating channel; said normally closed pressure compensating valve being arranged to gradually open upon the actuation of said first valve and gradually increase the fluid flow rate from the cylinder to a desired level and to maintain the fluid flow rate constant thereafter responsive to the cylinder pressure sensed by said control input.

7. A valve system as defined in claim 6 wherein said control input causes said normally closed pressure compensating valve to be closed prior to the actuation of said normally closed valve.

8. A valve system as defined in claim 7 wherein said second fluid communicating channel has a predetermined cross-sectional dimension, and wherein said baffle means comprises a partition wall within said second fluid communicating channel, said partition wall having an aperature therethrough being of smaller dimension than said predetermined cross-sectional dimension of said second fluid communicating channel.

9. A valve system as defined in claim 6 wherein said valve block further includes an inlet port adapted to be coupled to a fluid source containing fluid under pressure and third and fourth fluid communicating channels coupling said inlet port to the cylinder for providing the cylinder with fluid for raising the load.

10. A valve system as defined in claim 9 further including a check valve and wherein said valve block further includes a check valve receiving bore, said check valve being within said check valve receiving bore and having an input orifice communicating with said inlet port through said third fluid communicating channel and an output orifice communicating with the cylinder through said fourth fluid communicating channel for allowing fluid to flow to the cylinder but precluding fluid to flow from the cylinder through said third and fourth fluid communicating channels.

11. A valve system as defined in claim 10 wherein said valve block further includes a fluid return channel communicating with said normally closed pressure compensating valve output orifice and adapted to be coupled to the fluid source for returning the cylinder fluid to the fluid source as the load is lowered.

12. A valve system as defined in claim 11 further including a pressure relief valve, and wherein said valve block includes a pressure relief valve receiving bore intersecting said third fluid communicating channel and communicating with said fluid return channel, said pressure relief valve being within said pressure relief valve receiving bore for returning fluid from the fluid source back to the fluid source responsive to the fluid pressure within said third fluid communicating channel exceeding a predetermined pressure limit.

13. A valve assembly for metering the flow of hydraulic fluid from a cylinder port at a constant rate for lowering a load at a corresponding constant rate which has been raised by the cylinder responsive to the influx of the hydraulic fluid into the cylinder port, said system comprising: a valve block formed from solid material, said valve block having an outlet port adapted to be coupled to the cylinder port, first and second valve receiving bores, a first fluid channel communicating said outlet port with said first valve bore and a second fluid channel communicating said first valve bore with said second valve bore; a control valve within said first valve bore selectively actuable for permitting the hydraulic fluid to flow from the cylinder; a normally closed pressure compensating valve within said second valve bore for gradually increasing the flow rate of the hydraulic fluid to a predetermined constant final flow rate, said normally closed pressure compensating valve including a control input communicating with said outlet port for being directly coupled to the cylinder for continuously sensing the fluid pressure within the cylinder for causing said pressure compensating valve to maintain said predetermined final flow rate constant responsive to the sensed cylinder fluid pressure; and baffle means within said second fluid channel intermediate said control valve and said pressure compensating valve for restricting the flow of the hydraulic fluid from the cylinder and for determining said final hydraulic fluid flow rate.

* * * * *